US012329195B2

(12) United States Patent
Bruder et al.

(10) Patent No.: US 12,329,195 B2
(45) Date of Patent: Jun. 17, 2025

(54) WATER PIPE AND CATALYST UNIT FOR A WATER PIPE

(71) Applicant: InoxAir GmbH, Gelsenkirchen (DE)

(72) Inventors: René Bruder, Gelsenkirchen (DE); Siar Kaya, Dorsten (DE)

(73) Assignee: InoxAir GmbH, Gelsenkirchen (DE)

( * ) Notice: Subject to any disclaimer, the term of this patent is extended or adjusted under 35 U.S.C. 154(b) by 894 days.

(21) Appl. No.: 17/437,863

(22) PCT Filed: Mar. 2, 2020

(86) PCT No.: PCT/EP2020/055434
§ 371 (c)(1),
(2) Date: Apr. 22, 2022

(87) PCT Pub. No.: WO2020/182516
PCT Pub. Date: Sep. 17, 2020

(65) Prior Publication Data
US 2022/0256916 A1      Aug. 18, 2022

(30) Foreign Application Priority Data
Mar. 13, 2019    (EP) ..................... 19162557

(51) Int. Cl.
*A24F 1/30*      (2006.01)
*B01D 53/86*     (2006.01)
(Continued)

(52) U.S. Cl.
CPC .............. *A24F 1/30* (2013.01); *B01D 53/864* (2013.01); *B01D 53/885* (2013.01); *B01J 35/56* (2024.01);
(Continued)

(58) Field of Classification Search
CPC ....................................................... A24F 1/30
See application file for complete search history.

(56) References Cited

U.S. PATENT DOCUMENTS

| 1,513,147 | A | * | 10/1924 | Zahariadis | ................ | A24F 1/30 |
| | | | | | | 131/201 |
| 5,050,621 | A | * | 9/1991 | Creighton | ................ | A24D 1/22 |
| | | | | | | 131/194 |

(Continued)

FOREIGN PATENT DOCUMENTS

| CN | 106993825 A   | * | 8/2017 | ............... | A24F 1/30 |
| DE | 102020113923 B3 | * | 9/2021 | | |

(Continued)

OTHER PUBLICATIONS

Al-Kazwini, A.T., Said, A.J. & Sdepanian, S. "Compartmental analysis of metals in waterpipe smoking technique", BMC Public Health 15, 153 (2015). https://doi.org/10.1186/s12889-015-1373-6 (Year: 2015).*

(Continued)

*Primary Examiner* — Manley L Cummins, IV
(74) *Attorney, Agent, or Firm* — Calderon Safran & Wright P.C.; David S. Safran

(57) ABSTRACT

A water pipe with a washing vessel for a washing liquid, a smoke column and a pipe bowl for tobacco or tobacco substitutes. The smoke column and/or the washing vessel has at least one mouthpiece connection and in the ready-to-use state, i.e., when the washing vessel is at least partially filled with a washing liquid, and when a negative pressure is applied to the mouthpiece connection, a gas flow is effected from the pipe bowl via the smoke column into the washing vessel, into the washing liquid, into an unfilled volume of the washing vessel and through the mouthpiece connection. A receptacle for a fuel is implemented in the immediate vicinity of the pipe bowl. The fuel, in the ignited state, heats the tobacco or the tobacco substitute and generates smoke that can be consumed. Carbon monoxide exhaust gases (Continued)

generated are catalyzed by a catalyst unit located above the receptacle.

14 Claims, 5 Drawing Sheets

(51) Int. Cl.
  *B01D 53/88* (2006.01)
  *B01J 35/56* (2024.01)

(52) U.S. Cl.
  CPC ............... *B01D 2255/9022* (2013.01); *B01D 2257/502* (2013.01)

(56) References Cited

U.S. PATENT DOCUMENTS

| | | | |
|---|---|---|---|
| 5,469,835 A | 11/1995 | Stephen et al. | |
| 8,967,154 B2* | 3/2015 | Mitchell | F23Q 2/00 131/330 |
| 9,863,634 B1 | 1/2018 | Arnold, Jr. et al. | |
| 2004/0031495 A1* | 2/2004 | Steinberg | A61M 15/06 131/194 |
| 2009/0032034 A1* | 2/2009 | Steinberg | A24D 3/17 131/194 |
| 2017/0251718 A1 | 9/2017 | Armoush et al. | |
| 2022/0168691 A1* | 6/2022 | Bruder | B01D 53/864 |

FOREIGN PATENT DOCUMENTS

| | | |
|---|---|---|
| EP | 0354661 A2 | 2/1990 |
| EP | 3327353 A1 | 5/2018 |
| WO | 03034847 A1 | 5/2003 |

OTHER PUBLICATIONS

ScienceDirect Publisher Summary for "Chapter X: The Oxidation of Carbon Monoxide", Studies in Surface Science and Catalysis, vol. 15, 1983, pp. 280-311 [accessed Sep. 28, 2024]. Retrieved from Internet: <https://www.sciencedirect.com/science/article/abs/pii/S0167299108648351>. (Year: 2024).*

Phys.org citation: "Astonishing effect enables better palladium catalysts" (May 15, 2018) [accessed Sep. 27, 2024]. Retrieved from Internet: <https://phys.org/news/2018-05-astonishing-effect-enables-palladium-catalysts.html>. (Year: 2024).*

EPO Machine Translation of CN 106993825 A (published Aug. 1, 2017), 2024. (Year: 2024).*

DE_102020113923 English Translation (2021).*

* cited by examiner

WATER PIPE AND CATALYST UNIT FOR A WATER PIPE

BACKGROUND OF THE INVENTION

Field of the Invention

The invention relates to a water pipe with a washing vessel which can be filled with a washing liquid, a smoke column and a pipe bowl for receiving tobacco or tobacco substitutes, wherein the smoke column and/or the washing vessel has at least one mouthpiece connection and wherein, in the ready-to-use state, i.e., when the washing vessel is at least partially filled with a washing liquid, and when a negative pressure is applied to the mouthpiece connection, a gas flow is effected from the pipe bowl via the smoke column into the washing vessel, into the washing liquid, into an unfilled volume of the washing vessel and through the mouthpiece connection, wherein a receptacle for a fuel is implemented in the immediate vicinity of the pipe bowl and wherein the fuel, in the ignited state, heats the tobacco or the tobacco substitute and thus produces smoke which can be consumed. In addition, the invention also relates to a catalyst unit for such a water pipe comprising a catalyst for catalyzing the oxidation of carbon monoxide to carbon dioxide with oxygen.

Description of the Related Art

Water pipes of the type previously described and their use have a centuries-old tradition, the roots of which are believed to date back to the Persian Empire of the 15th century. However, water pipe smoking has spread worldwide and is increasingly popular in the western world as well. Water pipes are also called—in different spellings—shisha or also hookah; however, the principle of operation is the same everywhere.

The previously mentioned elements of the water pipe, pipe bowl, smoke column and washing vessel, usually have a vertical structure. The washing vessel is at the bottom and can be filled with a washing liquid and is usually placed on a flat surface, such as a table. There is an opening at the top of the washing vessel into which the smoke column is inserted, which extends relatively far into the washing vessel. The smoke column extends so far into the washing vessel that the lower end of the smoke column reaches below the level of the washing liquid that is filled into the washing vessel in the ready-to-use state. The washing liquid can simply be water. In some cases, however, additives are also added to the water, so that the washing liquid ultimately consists of a—flavored—liquid mixture. The extension of the smoke column above the washing vessel may—in rather rarely encountered designs—not be present at all, but in more frequently encountered designs it can be well over 10 cm vertically upwards, whereby effective smoke cooling can take place. The smoke column ends in an upper opening. Here, "above/up" and "below/down", have the common meaning, namely that of the orientation of the earth's gravitational field, whose force effect is "down"; the opposite direction is therefore "up".

A pipe bowl is arranged at the upper opening of the smoke column, i.e., at the opening which does not protrude into the washing liquid in the washing vessel, usually the pipe bowl is inserted into the upper opening of the smoke column. The pipe bowl has an upward-opened, bowl-shaped form and it is used to hold tobacco or even tobacco substitutes. Tobacco used in water pipes are usually much wetter than tobacco burned in cigarettes or even pipes. Tobacco used in water pipes usually has humectants added, such as molasses and/or glycerine. Herbs or porous stones soaked in a liquid are used as tobacco substitutes, for example.

A receptacle for fuel is implemented in the immediate vicinity of the bowl of the pipe. The fuel is ignited when ready for use and emits combustion heat accordingly. Usually, the fuel is charcoal.

In some designs of the water pipe, the receptacle for the fuel is simply implemented in the form of the bowl of the pipe. In other words, glowing pieces of charcoal are placed directly on the tobacco. Accordingly, the receptacle has no representational-constructive features of its own.

In other designs and uses, in particular in designs that have also found widespread use in the western world, the upper opening of the pipe bowl is covered with a tray for the fuel. The tray may, for example, consist of one or more layers of aluminum foil stretched over the upper rim of the pipe bowl. The receptacle for the fuel—for the charcoal—is then thus formed by the upper side of the stretched aluminum foil, which is perforated before use. In another design, a metal grid is simply placed on the upper opening of the pipe bowl, the surface of which then forms the receptacle for the fuel. In the latter two cases, the fuel does not come into direct contact with the tobacco or tobacco substitute during operation of the water pipe. What the described designs have in common, however, is that the close proximity of the receptacle for the fuel to the bowl of the pipe, and thus to the tobacco (or tobacco substitute) therein, causes the tobacco to be heated to the point where a corresponding smoke is produced. This smoke is not the result of a combustion process, since the tobacco or tobacco substitute is not necessarily burned. Rather, the tobacco—which usually has a high moisture content—is heated only to the point where a corresponding vapor is formed, which is also to be understood here as "smoke".

Usually, a mouthpiece connection is provided on the smoke column, but this can also be functionally implemented in the upper area of the washing vessel. In both cases, a hose with a mouthpiece is usually connected to the mouthpiece connection. By generating negative pressure at the mouthpiece, the gas flow described at the beginning is set in motion. The smoke released by the heated tobacco or tobacco substitute is transported from the bowl via the smoke column into the washing vessel. The smoke then passes through the washing liquid and rises into an unfilled volume of the washing vessel, i.e., not filled with washing liquid, and from there reaches the smoker through the mouthpiece connection and a connected hose.

A serious problem arises from the fuel exhaust gases generated by the fuel when ignited. In particular, the carbon monoxide (with the molecular formula CO) contained in the exhaust gases is problematic because it is extremely toxic, but nonetheless imperceptible to humans because it is colorless, odorless, and tasteless. It is typically produced during the incomplete combustion of carbonaceous fuels—such as the charcoal chips that are normally used. Especially when water pipes are operated in closed or insufficiently ventilated rooms, there is an acute risk of carbon monoxide poisoning. The smoke inhaled via the smoke column undoubtedly also has a harmful effect on health, but the carbon monoxide content is very low, in some cases below the detection threshold achievable with hand-held measuring devices. The problem in this respect is therefore essentially the exhaust gases produced during the combustion of the carbonaceous fuels, which escape upwards from the water pipe.

SUMMARY OF THE INVENTION

The object of the present invention is therefore to provide a water pipe or an auxiliary device for a water pipe in which the risk of carbon monoxide poisoning by exhaust gases during combustion of the (carbonaceous) fuel is substantially reduced.

The previously derived object is initially and essentially achieved in the water pipe described in the introduction in that a catalyst unit with a catalyst for catalyzing the oxidation of carbon monoxide to carbon dioxide with oxygen is arranged above the receptacle for the fuel in such a way that the fuel exhaust gases produced in the ignited state of the fuel are at least partially passed through the catalyst unit and at least some of the carbon monoxide present in the exhaust gases is oxidized to carbon dioxide. By arranging the catalyst unit and thus also the catalyst itself above the receptacle for the fuel, the fuel exhaust gases containing the toxic carbon monoxide are caused to be passed through the catalyst unit, where they come at least partially into contact with the catalyst and the proportion of carbon monoxide in the fuel exhaust gases is thus effectively reduced. A water pipe designed in this way has the advantage that a significant problem in the use of water pipes is eliminated by very simple means. If the catalyst unit is cleverly designed, the carbon monoxide content in the fuel exhaust gases can be eliminated for the most part by the catalytic process to be used. This makes the use of water pipes in enclosed spaces quite considerably safer, and in particular, also reduces the requirements for corresponding ventilation and exhaust systems.

In a preferred design of the invention, it is provided that the catalytic unit is arranged or designed in such a way that, in the operating state when the fuel is ignited, the oxygen required for catalyzing the oxidation of carbon monoxide to carbon dioxide is provided by ambient air. This has the advantage that oxygen does not have to be provided separately for catalyzing the oxidation. Although this reduces the oxygen content in the ambient air, since this is bound during the oxidation of carbon monoxide to carbon dioxide, carbon dioxide is not toxic per se, at least not in the concentrations produced here.

In a further advantageous design, it is provided that the catalyst unit has a catalyst through which flow can take place, wherein in the intended operating state, when the fuel is ignited and the catalyst is flowed through by the fuel exhaust gases, the catalyst has a low flow resistance between the inflow side and the outflow side. The flow resistance should be selected such that a pressure drop between the inflow side and the outflow side of the catalyst is at most 15 Pa, preferably at most 1 Pa, preferably at most 0.5 Pa, more preferably at most 0.05 Pa. The lower the flow resistance, the easier it is for the fuel exhaust gases to pass through the catalyst, thus avoiding congestion effects on the inflow side of the catalyst. The flow resistance cannot be made arbitrarily small, since the catalyst must, of course also, provide a sufficiently large surface area in the flow of fuel exhaust gases so that the desired proportion of carbon monoxide from the fuel exhaust gases is converted to carbon dioxide by catalysis.

In another preferred design, it is provided that the catalyst unit and, with it, the catalyst are designed such that the energy released from the ignited fuel is sufficient to drive the fuel exhaust gases through the catalyst unit and catalyst. This embodiment has the advantage that no auxiliary device needs to be provided to drive the fuel exhaust gases through the catalyst. Thus, the gas stream is driven by the energy released by the ignited fuel itself. The main effect here is to cause a convection flow, so that hot and thus less dense fuel exhaust gases rise upward into the cooler and thus denser ambient air and thus automatically find their way through the catalyst, which is arranged above the receptacle for fuel.

It has been found to be advantageous if the catalyst is formed at least in part from a coated, open-pore ceramic foam, wherein the coating is formed at least in part from metal oxides, in particular transition metals and/or noble metals. Such catalysts have been found to be very robust. In addition, they have the advantage that they can be cleaned comparatively easily, for example with a moderate flow of compressed air.

Preferably, the catalyst unit is arranged relative to the receptacle for the fuel in such a way that, in the operating state with ignited fuel, the energy transported by the ignited fuel to the catalyst of the catalyst unit is sufficient to achieve the catalyst temperature required for the catalysis of carbon monoxide to carbon dioxide to be effected. This design of the water pipe according to the invention or of the catalyst unit used therein is also advantageous in particular because a separate energy supply for heating the catalyst can be completely dispensed with, the catalyst thus reaches its start-up temperature solely by energy supply from the ignited fuel (thermal radiation) and by the fuel exhaust gases caused thereby (convection). The heat input here occurs, on the one hand, through the hot convective flow of the fuel exhaust gases through the catalyst, but, on the other hand, also through direct heat radiation from the ignited fuel.

Preferably, such a catalyst is selected which has a required catalyst temperature (start-up temperature) of at most 800° C., preferably of at most 400° C., preferably of at most 300° C., particularly preferably of at most 200° C. and further preferably of at most 100° C. Catalysts with a low start-up temperature have the advantage that they reach their operating temperature more quickly and thus the desired effect of catalyzing carbon monoxide into carbon dioxide is achieved more quickly. Various experiments have shown that different catalysts exhibit the catalytic effect even below their specified start-up temperature, i.e., they lower the activation energy of the desired oxidation.

A preferred design of the catalyst unit is characterized in that the catalyst unit comprises a tube and the catalyst, wherein the tube extends between a first tube opening and a second tube opening, wherein, in the assembled state of the catalyst unit, the first tube opening is arranged below the second tube opening, wherein the catalyst is held in the cross-section of the tube with a holding device between the first tube opening and the second tube opening, namely above the receptacle for the fuel and thus also above the fuel. The catalyst is to occupy in particular at least 99%, in particular at least 95%, preferably at least 85%, most preferably at least 75% of the cross-sectional area of the tube. The larger the cross-sectional area covered by the catalyst in the tube, the lower the possible stagnation effects in the flow. On the other hand, the catalyst is only effective in the area through which fuel exhaust gases flow. When designing the size of the catalyst, therefore, a trade-off must be made between the different costs of catalysts of different sizes and the flow boundary conditions to be set.

Preferably, the holding device of the catalyst unit in the tube is designed as an at least partially circumferential collar. The collar does not have to be completely circumferential; it can also have various interruptions. In any case, it is important that the catalyst can be supported on the collar inside the tube in the assembled state on the basis of its weight.

In a preferred design, it is provided that the holding device for the catalyst is arranged adjustably along the extension of the tube from the first opening to the second opening. This makes it possible to adapt the catalyst unit to the geometry of various commercially available water pipes—i.e., those not equipped with a catalyst unit. In particular, it is then possible to fit an adaptation to pipe bowls of different heights of a water pipe.

Preferably, flow openings are provided between the wall of the tube and the catalyst, in particular flow openings with a free cross section. These flow openings functionally act as a bypass for bypassing the flow path through the catalyst. Since the flow openings are provided between the wall of the tube and the catalyst, i.e., outside the central flow area of the fuel exhaust gases, these flow openings are increasingly used only if the actual flow path of the fuel exhaust gases through the catalyst is blocked, for example by respective contamination.

In a particularly preferred design of the invention, it is provided that a catch plate is arranged below the bowl of the pipe on the smoke column. Such constructions are already known in commercially available water pipes. The catch plate serves essentially to catch fuel or ash falling from its location. For this, the catch plate has a larger diameter than the largest pipe bowl diameter, otherwise it would not be able to fulfill its function of catching falling fuel particles. It is now provided that the first tube opening of the tube of the catalyst unit is designed in such a way that the tube can be placed with the first tube opening over the pipe bowl and, in the assembled state, comes to rest with the edge of the first tube opening on the catch plate. The catalyst unit is thus supported here on the catch plate and then extends quasi tube-shaped vertically upwards past the pipe bowl and beyond the receptacle for the fuel, so that the tube can also hold the catalyst above the receptacle for the fuel—and thus also above the fuel itself.

Such a design of the catalyst unit is particularly well suited as a separate accessory for a water pipe, since it can also be used for water pipes that are not yet equipped with a catalyst unit.

In order to ensure a sufficient supply of ambient air to the fuel, it is further additionally provided that the tube has at least one ventilation opening in its wall, wherein ambient air can reach the receptacle for the fuel in the interior of the catalyst unit through the ventilation opening, in particular wherein the ventilation opening is provided between the first tube opening and the holding device for the catalyst.

The object according to the invention is further achieved by a catalyst unit for a water pipe. The catalyst unit is seen here as a separate component prepared for use with a water pipe. Thus, it is a matter of a separate catalyst unit having the properties of the catalyst unit previously illustrated in connection with the described water pipe. Thus, it is a catalyst unit for a water pipe with a catalyst for catalyzing the oxidation of carbon monoxide to carbon dioxide with oxygen, wherein the water pipe comprises a washing vessel that can be filled with a washing liquid, a smoke column and a pipe bowl for receiving tobacco or tobacco substitutes, wherein the smoke column and/or the washing vessel has at least one mouthpiece connection and wherein, in the ready-to-use state, i.e., when the washing vessel is at least partially filled with a washing liquid, and when a negative pressure is applied to the mouthpiece connection, a gas flow is effected from the pipe bowl via the smoke column into the washing vessel, into the washing liquid, into an unfilled volume of the washing vessel and through the mouthpiece connection, wherein a receptacle for a fuel is implemented in the immediate vicinity of the pipe bowl, and wherein the fuel, in the ignited state, heats the tobacco or the tobacco substitute and thus generates smoke that can be consumed, wherein the catalyst unit is designed in such a way that it can be arranged on the water pipe above the receptacle for the fuel in such a way that the fuel exhaust gases produced in the ignited state of the fuel are at least partially passed through the catalyst unit and at least part of the carbon monoxide present in the exhaust gases is oxidized to carbon dioxide. All of the features discussed above in connection with the catalyst unit of the water pipe are, of course, equally applicable to the aforementioned catalyst unit.

In detail, there is now a plurality of possibilities for designing and further developing the water pipe according to the invention and the catalyst unit according to the invention as will become apparent from the following description of preferred embodiments in conjunction with the accompanying drawings.

DETAILED DESCRIPTION OF THE INVENTION

Figure 1:
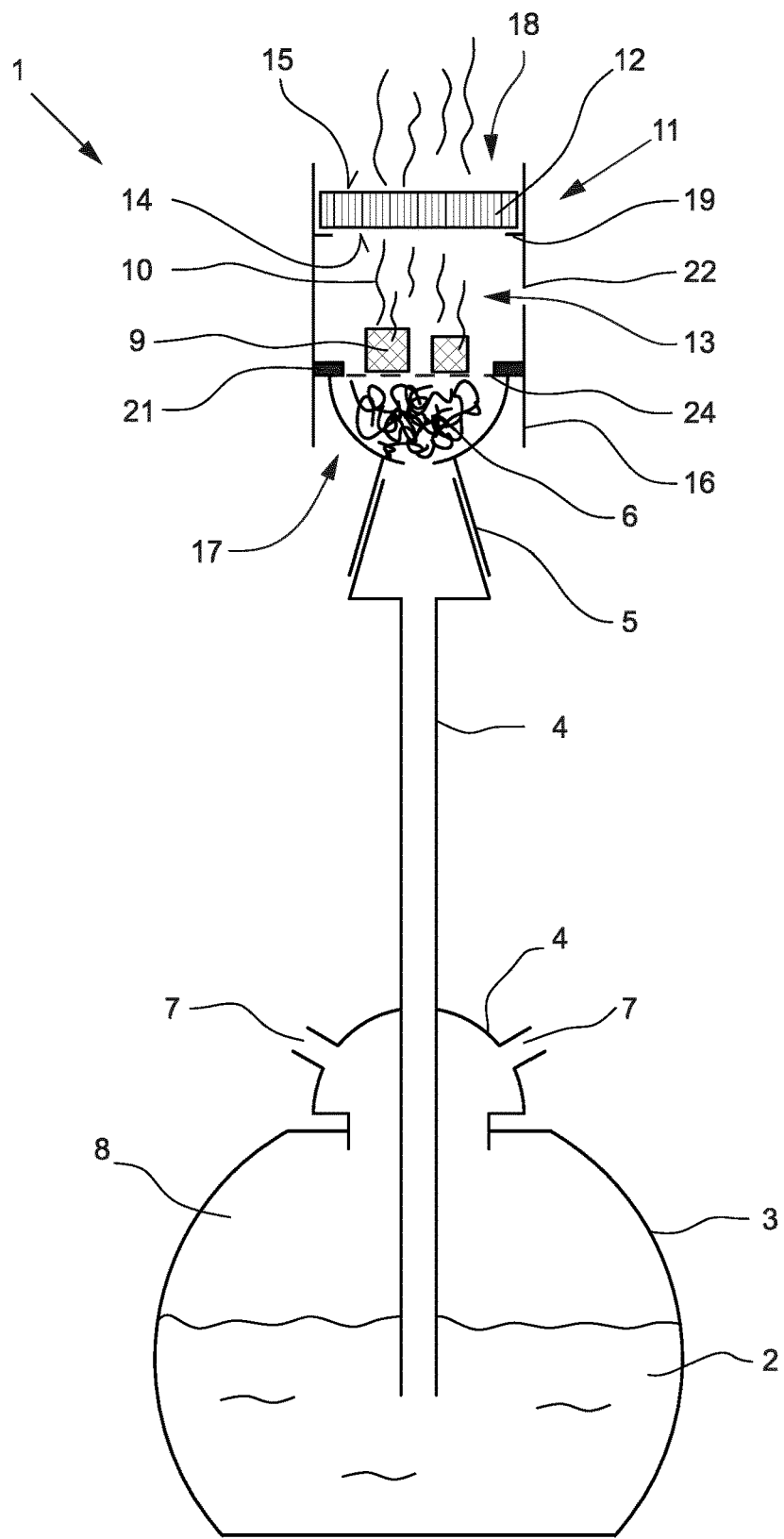
FIG. 1 is a schematic depiction of a water pipe with a long smoke column and with catalyst unit.
Figure 2:
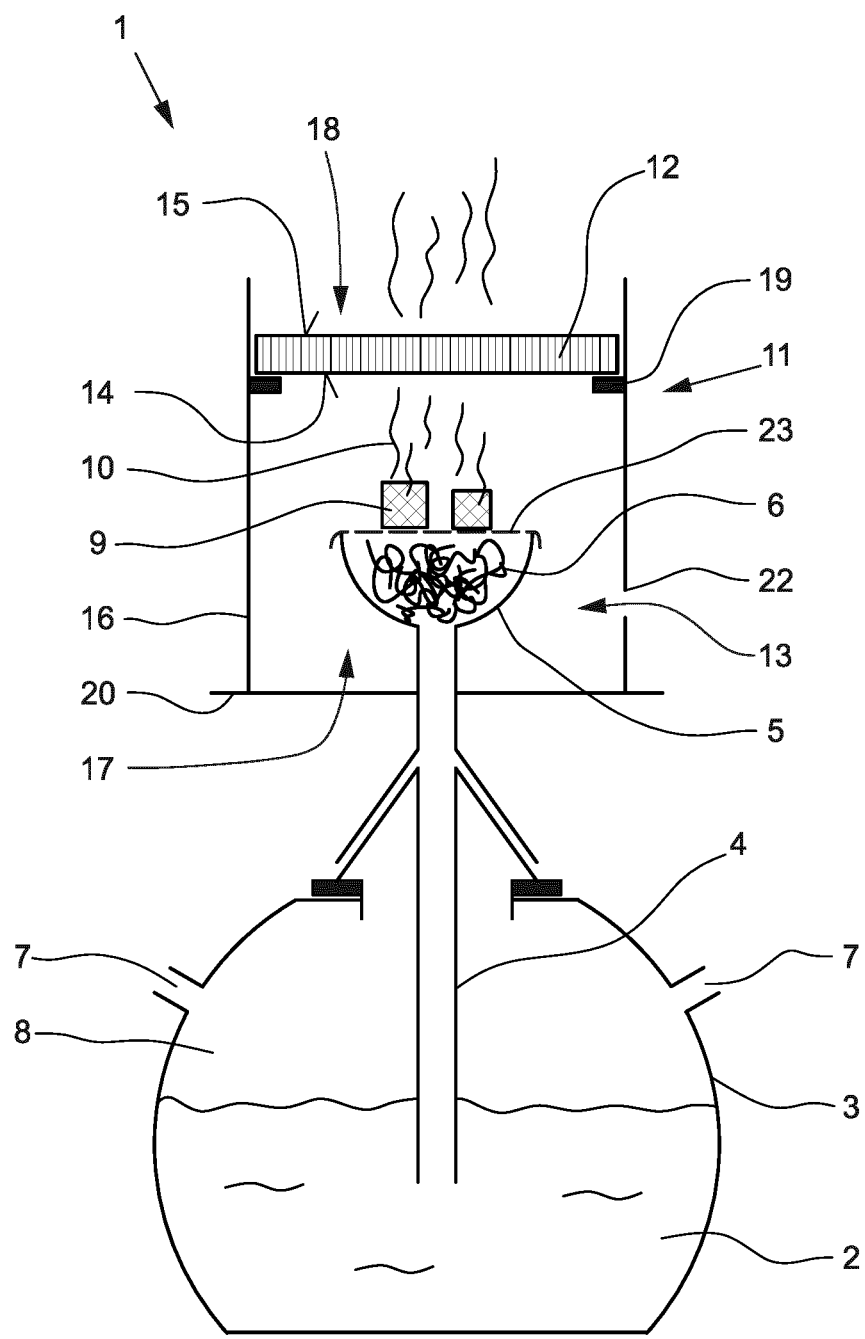
FIG. 2 is a schematic depiction of a water pipe with a very short smoke column outside the washing vessel and with a catalyst unit.

In each of FIGS. 1 and 2, a water pipe 1 is shown in its entirety. The water pipe 1 has a washing vessel 3 filled with a smoke washing liquid 2, a smoke column 4 and a pipe bowl 5 for holding tobacco 6 or tobacco substitutes. In the embodiment shown in FIG. 1, the smoke column 4 has two mouthpiece connections 7. In the embodiment in FIG. 2, the washing vessel 3 has the mouthpiece connection 7.

In FIGS. 1 and 2, the water pipe 1 is in the ready-to-use state, and the washing vessel 3 is partially filled with the washing liquid 2. It can be seen from FIGS. 1 and 2 that when a negative pressure is applied to the mouthpiece connections 7, a gas flow is effected from the pipe bowl 5 via the smoke column 4 into the washing vessel 3, from there into the washing liquid 2, into an unfilled volume 8 of the washing vessel 3 and finally through the mouthpiece connection 7. A receptacle for a fuel 9 is implemented in the immediate vicinity of the pipe bowl 5, wherein the fuel 9 in the present embodiments is small pieces of charcoal. The fuel 9 is ignited and heats the tobacco 6 so that smoke or vapor suitable for consumption is finally produced.

Figure 3:
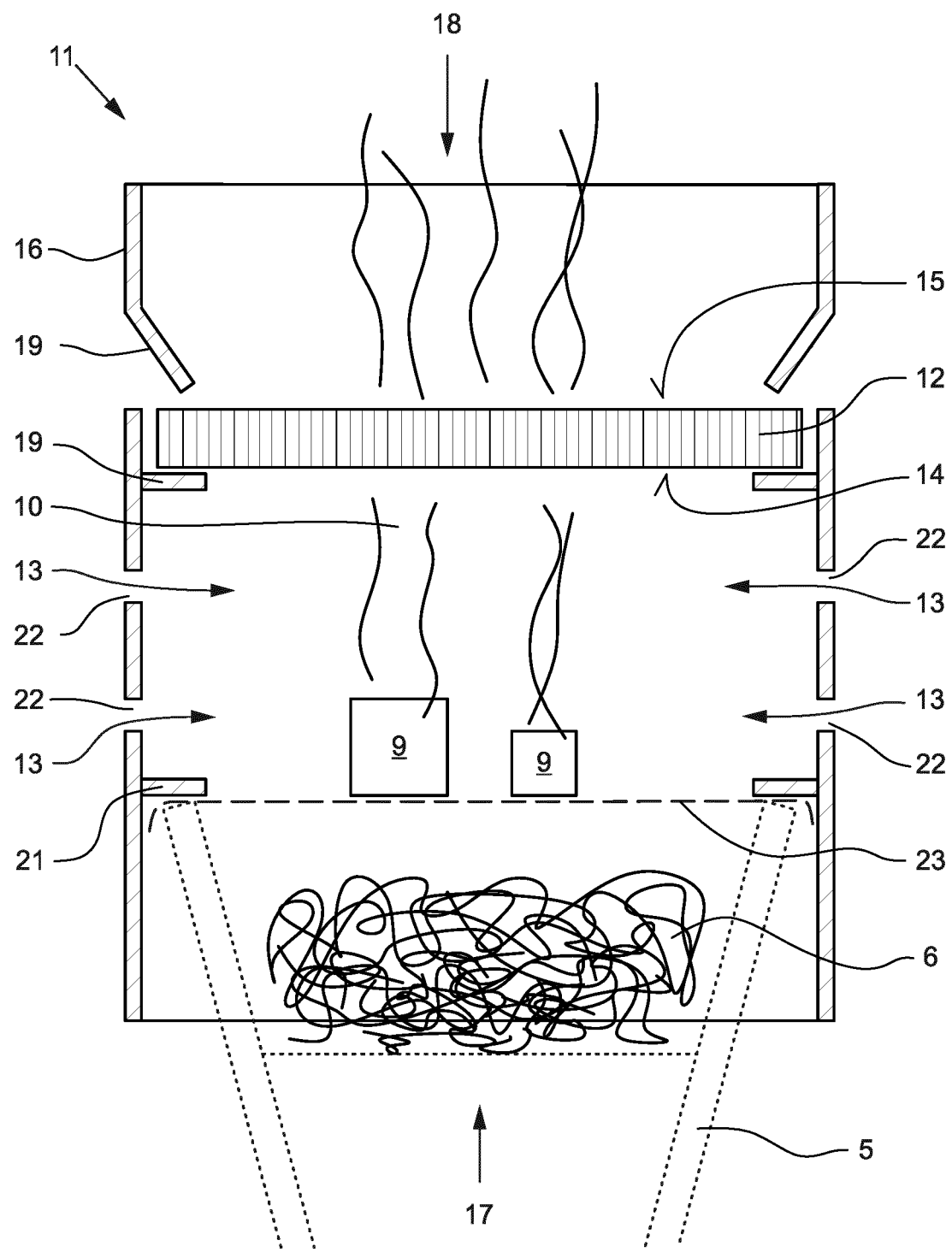
FIG. 3 is schematic depiction of a catalyst unit with a pipe bowl that is only partially indicated.

In FIGS. 2 and 3, the receptacle for the fuel 9 is defined by two layers of perforated aluminum foil 23, namely on the upper side of the aluminum foil 23. In the other embodiments according to FIGS. 1, 4 and 5, the receptacle is implemented by a perforated sheet 24 on which the fuel 9 rests.

Carbon monoxide gas is produced during the primarily incomplete combustion of the carbonaceous fuel 9. Carbon monoxide is toxic to humans and causes asphyxiation above a certain breathing air concentration. The carbon monoxide is mainly a component of the fuel exhaust gas 10 produced in the ignited state of the fuel 9. The emission of carbon monoxide is a massive problem, especially when water pipes 1 are operated in closed rooms. Here, it is not uncommon for inadmissible carbon monoxide concentrations to be reached due to inadequate provision for adequate ventilation of the premises.

To solve this problem, a catalyst unit 11 with a catalyst 12 is arranged above the receptacle for the fuel 9—and thus, above the fuel 9. The catalyst 12 is used to catalyze the oxidation of carbon monoxide to carbon dioxide with oxygen. The catalyst unit 11 is arranged such that the fuel exhaust gases 10 produced in the ignited state of the fuel 9 are at least partially passed through the catalyst unit 11, and at least part of the carbon monoxide present in the fuel exhaust gases 10 is oxidized to carbon dioxide. The following, thus, essentially deals with the embodiment of the catalyst unit 11, which is shown schematically in FIGS. 3 to 5, but nevertheless in greater detail.

Common to all embodiments is that the catalyst unit 11 is arranged or designed in such a way that, in the operating state, i.e., when the fuel 9 is ignited, the oxygen required for catalyzing the oxidation of carbon monoxide to carbon dioxide is provided by the ambient air 13. This makes it possible to dispense of a separate oxygen supply to the catalyst 12, and the catalyst unit 11 can thus be used independently of a separate oxygen supply. To this end, design measures are taken in part, which will be described further below. In the figures, the flow paths of the ambient air 13 are partially indicated.

In all embodiments, the catalyst unit 11 has a catalyst 12 through which the flow can pass, wherein, in the intended operating state, with the fuel 9 ignited and the catalyst 12 with the fuel exhaust gases 10 flowing through it, the catalyst 12 has a very low flow resistance between the inflow side 14 and the outflow side 15. The flow resistance is set here such that, in the operating state and in flow equilibrium, at most a pressure difference between the inflow side 14 and the outflow side 15 of the catalyst 12 of at most 0.5 Pa is established.

All the embodiments shown also have in common that the catalyst unit 11 and, with it, the catalyst 12 are designed in such a way that (under relatively normal ambient conditions) the energy released by the ignited fuel 9 is sufficient to drive the fuel exhaust gases 10 through the catalyst unit 11 and the catalyst 12. This measure also recognizably contributes to the catalyst unit 11 being able to be operated in a self-sufficient manner.

In the illustrated embodiments, the catalyst 12 is formed from a coated, open-pored ceramic foam. To achieve the catalytic effect, the ceramic foam is coated with metal oxides, in this case transition metals and noble metals. In the illustrated embodiments, the catalyst unit 11 is arranged with respect to the receptacle for the fuel 9, and thus with respect to the fuel 9 itself, such that in the operating condition when the fuel 9 is ignited, the energy transported by the ignited fuel 9 to the catalyst 12 of the catalyst unit 11 is sufficient to achieve the catalyst temperature required for the catalysis of carbon monoxide to carbon dioxide to be effected. In the illustrated embodiments, the catalyst 12 has a required catalyst temperature of 350° C. However, experiments have shown that the catalytic effect promotes oxidation of carbon monoxide with atmospheric oxygen to carbon dioxide even at substantially lower temperatures above 150° C.

As a result, the catalyst unit 11 shown in the figures can be operated completely autonomously. A supply of separate oxygen is not required (the atmospheric oxygen present in the ambient air 13 is sufficient), the catalyst unit 11 does not need to be force-ventilated (the convective air flow or flow of fuel exhaust gases 10 caused by the combustion of the fuel 9 is sufficient), and the catalyst 12 used does not require any energy supply other than that which it receives anyway due to its arrangement above the ignited fuel 9. The catalyst unit 11 can thus, for example, also simply be placed on an already existing conventional water pipe, i.e., a water pipe which is not yet equipped with a catalyst unit 11, so that the problem of the emission of carbon monoxide can be remedied very quickly and without any conversion measures.

Figure 4:
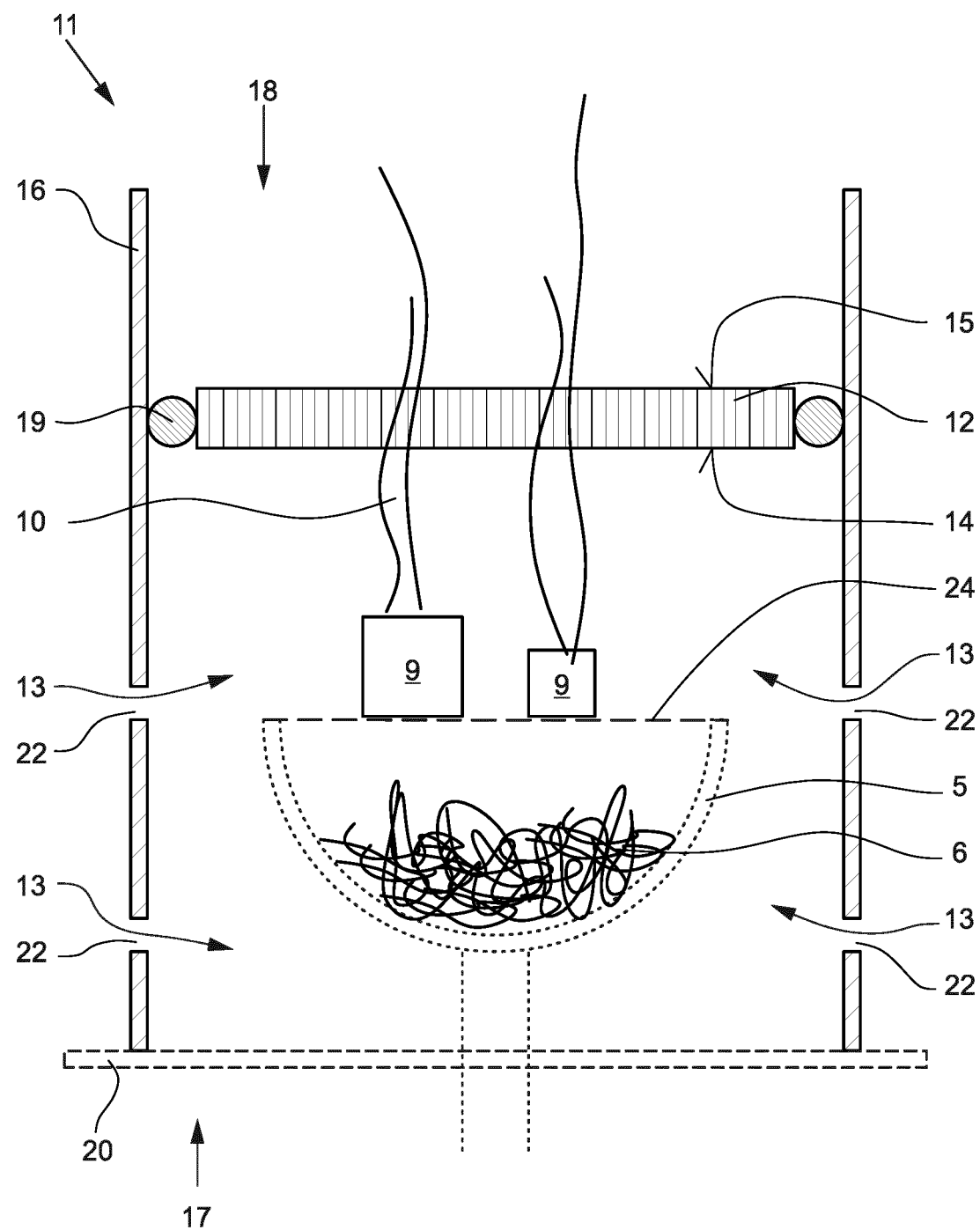
FIG. 4 is schematic depiction of an alternative design of a catalyst unit with only a pipe bowl indicated.
Figure 5:
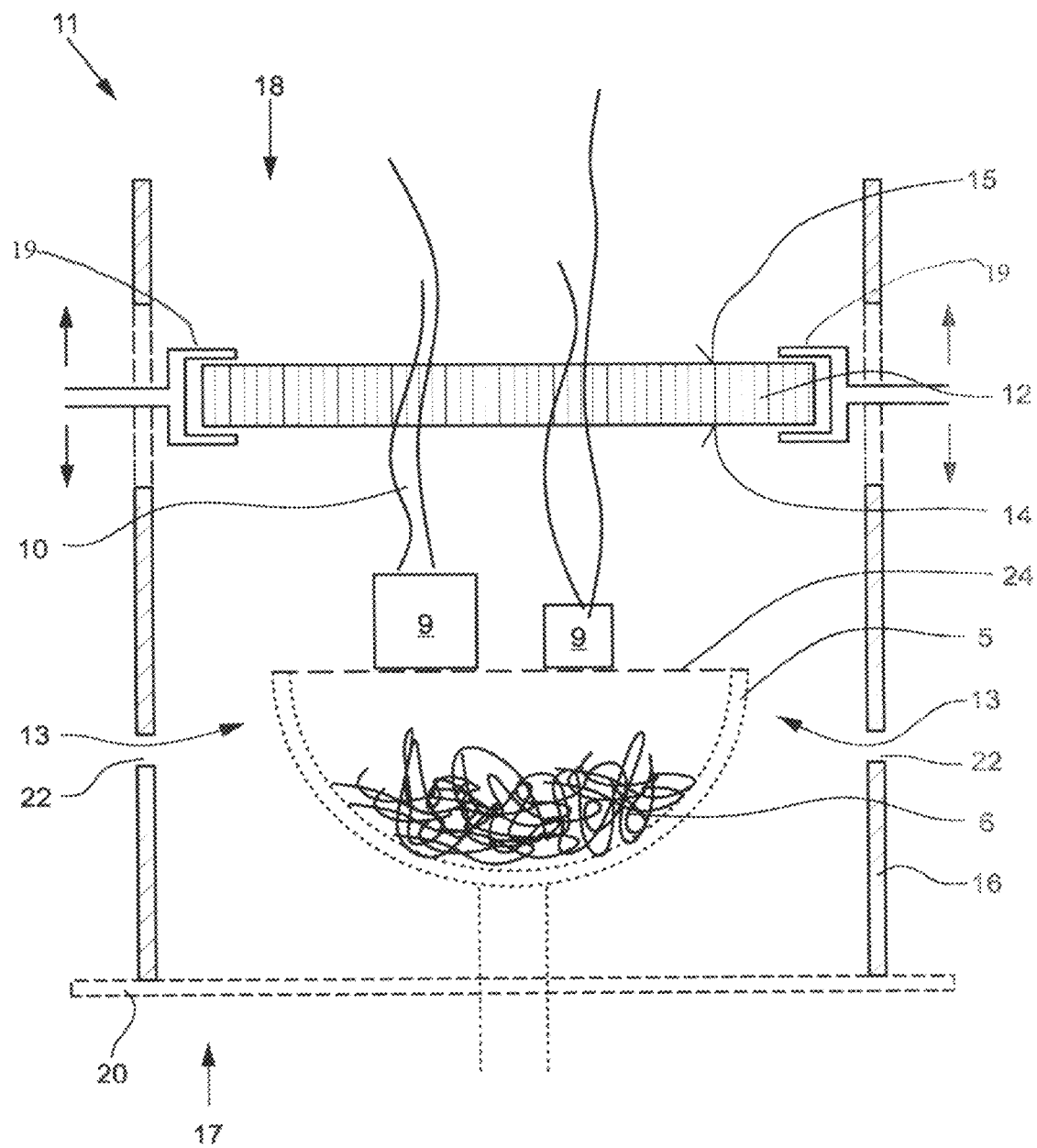
FIG. 5 is a schematic depiction of a further embodiment of a catalyst unit with only a pipe bowl indicated, wherein the catalyst is held adjustably in a holding device.

In the embodiments shown, the catalyst unit 11 has a tube 16 and the, already-described, catalyst 12. The tube 16 extends between a first tube opening 17 and a second tube opening 18. In the assembled state of the catalyst unit 11, the first tube opening 17 is arranged below the second tube opening 18. The catalyst 12 is held in the cross-section of the tube 16 with a holding device 19 between the first tube opening 17 and the second tube opening 18. This is illustrated in FIGS. 3 to 5. In the illustrated embodiments, the catalyst 12 occupies over 90% of the cross-section of the tube 16.

In FIG. 3, the holding device 19 of the catalyst unit 11 in the tube 16 is formed as an at least partially circumferential collar, wherein the collar has interruptions. In the assembled state, the catalyst 12 is supported on the collar or the collar elements on the basis of its weight. Above the catalyst 12, two retaining tabs are notched out of the tube 16 and bent into the interior of the tube 16, thus preventing the catalyst 12 from falling out of the tube 16.

The collar is soldered to the tube 16 in FIG. 3. In alternative embodiments not shown here, the collar is clamped in the tube 16, riveted to the tube 16, spot welded to the tube 16, or bonded to the tube 16 with a heat resistant adhesive. In another embodiment, the collar is made by locally forming the tube 16 itself.

In FIG. 4, the holding device 19 is formed by a high-thermal-strength sealing cord, such as is used in chimney construction. The sealing cord is glued to the inner wall of the tube 16 with a suitable adhesive.

The embodiment according to FIG. 5 has the special feature that the holding device 19 for the catalyst 12 is arranged adjustably along the extension of the tube 16 in directions toward and away from the tube openings 17 and 18 as represented by the oppositely directed arrows, whereby the catalyst unit 11 can be adapted to the dimensions of different water pipes.

In FIGS. 4 and 5, it is shown that a catch plate 20 is arranged below the pipe bowl 5 on the smoke column 4, wherein the catch plate 20 has a larger diameter than the largest pipe bowl diameter. The first tube opening 17 is designed in such a way that the tube 16 can be placed with the first tube opening 17 over the pipe bowl 5 and, in the assembled state, the tube 16 comes to rest with the edge of the first tube opening 17 on the catch plate 20. The catalyst unit 11 thus stands on the catch plate 20.

In the embodiments according to FIGS. 1 and 3, a different type of placement of the catalyst unit 11 in the region of the pipe bowl 5 is implemented. Here, the tube 16 has a further retaining collar 21 in the region of the first opening 17, with which the catalyst unit 11 is supported on the edge of the pipe bowl 5.

In all embodiments shown, the tube 16 has ventilation openings 22 in its wall, wherein ambient air can reach the receptacle of the fuel 9 in the interior of the catalyst unit 11 through the ventilation openings 22, wherein the ventilation openings 22 are provided between the first tube opening 17 and the holding device 19 for the catalyst 12.

What is claimed is:

1. A water pipe, comprising:
   a washing vessel which can be filled with a washing liquid,
   a smoke column,
   a pipe bowl for receiving tobacco or tobacco substitutes, and
   a receptacle for a fuel in the immediate vicinity of the pipe bowl and wherein the fuel, in the ignited state, heats the tobacco or the tobacco substitute and thus generates smoke which is suitable for consumption,
   a catalyst unit having a tube with upper and lower openings and a catalyst for catalyzing the oxidation of carbon monoxide to carbon dioxide, an outlet side of the catalyst facing toward the upper opening,
   wherein the pipe bowl is located in the tube below the catalyst,
   wherein the receptacle is located in the tube between the pipe bowl and the catalyst,
   wherein the smoke column extends into proximity of the pipe bowl,
   wherein the smoke column and/or the washing vessel has at least one mouthpiece connection and
   wherein, in a ready-to-use state when the washing vessel is at least partially filled with a washing liquid and when a negative pressure is applied to the mouthpiece connection, a gas flow is produced from the pipe bowl out of the lower opening of the tube via the smoke column into the washing vessel, into the washing liquid, into an unfilled volume of the washing vessel and through the mouthpiece connection,
   at least one inlet for oxygen arranged between the lower opening of the tube and the catalyst in such a way that the fuel exhaust gases produced in the ignited state of the fuel are passed at least partially through the catalyst unit toward the upper opening of the tube and at least some of the carbon monoxide present in fuel exhaust gases is oxidized to carbon dioxide.

2. The water pipe according to claim 1, wherein the catalyst unit is arranged to receive ambient air as a source of oxygen required to catalyze the oxidation of carbon monoxide to carbon dioxide.

3. The water pipe according to claim 1, wherein the catalyst unit has a catalyst through which flow is possible, wherein, in the intended operating state with ignited fuel and catalyst through which the fuel exhaust gases flow, the catalyst has a flow resistance between an inflow side and an outflow side that produces a pressure drop of at most 15 Pa.

4. The water pipe according to claim 1, wherein the catalyst unit has a catalyst through which flow is possible, wherein, in the intended operating state with ignited fuel and catalyst through which the fuel exhaust gases flow, the catalyst has a flow resistance between an inflow side and an outflow side that produces a pressure drop of at most 0.05 Pa.

5. The water pipe according to claim 1, wherein the catalyst unit with the catalyst is able to release sufficient energy by the ignited fuel to drive the fuel exhaust gases through the catalyst unit and the catalyst.

6. The water pipe according to claim 1, wherein the catalyst is formed at least in part of an open-pore ceramic foam that is coated at least in part with a metal oxide.

7. The water pipe according to claim 6, wherein the catalyst has a required catalyst temperature of at most 800° C.

8. The water pipe according to claim 6, wherein the catalyst has a required catalyst temperature of at most 100° C.

9. The water pipe according to claim 1, wherein the catalyst of the catalyst unit is arranged relative to the receptacle for the fuel in such a way that, in the operating state when the fuel is ignited, the energy transported by the ignited fuel to the catalyst of the catalyst unit is sufficient to achieve a catalyst temperature sufficient for catalysis of carbon monoxide to carbon dioxide.

10. The water pipe according to claim 1, wherein at least 75% of the catalyst is held in a cross-sectional area of the tube by a holding device between the first tube opening and the second tube opening.

11. The water pipe according to claim 10, wherein the holding device comprises an at least partially circumferential collar, and wherein the collar has interruptions on which the catalyst is supported in the assembled state by its weight.

12. The water pipe according to claim 10, wherein the holding device for the catalyst is arranged adjustably along an extension of the tube from the first tube opening to the second tube opening.

13. The water pipe according to claim 10, wherein flow openings are formed between a wall of the tube and the catalyst.

14. The water pipe according to claim 10, wherein a catch plate is arranged below the pipe bowl on the smoke column, wherein the catch plate has a larger diameter than a largest pipe bowl diameter, and wherein the first tube opening is locatable with the first tube opening over the pipe bowl and, in the assembled state, resting with an edge of the first tube opening on a catch plate.

* * * * *